Figure 1:
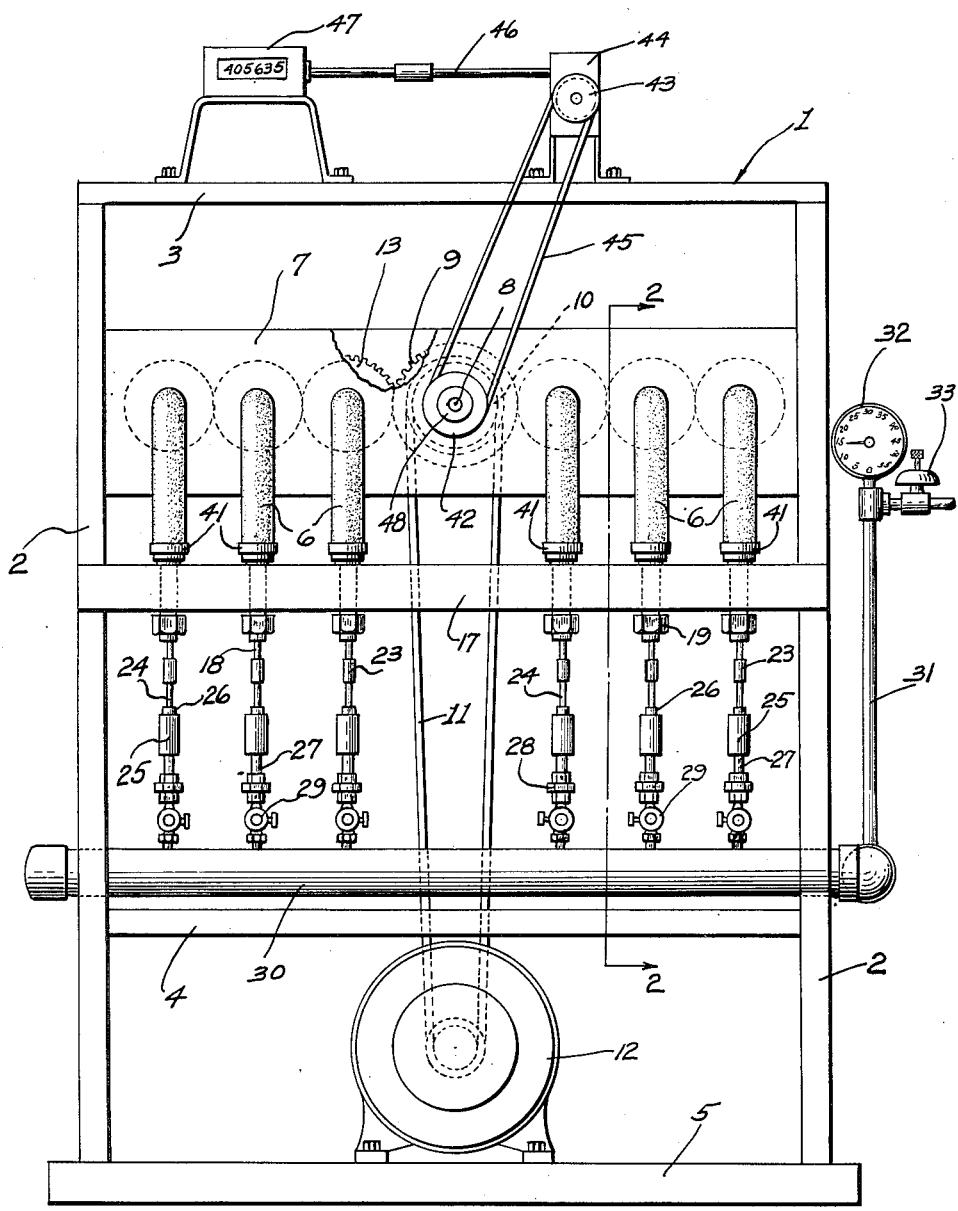

Dec. 10, 1946.　　　G. D. MALLORY　　　2,412,524
FATIGUE TEST FOR TIRE CORD
Filed Sept. 19, 1944　　　2 Sheets-Sheet 1

Inventor
Gerald D. Mallory

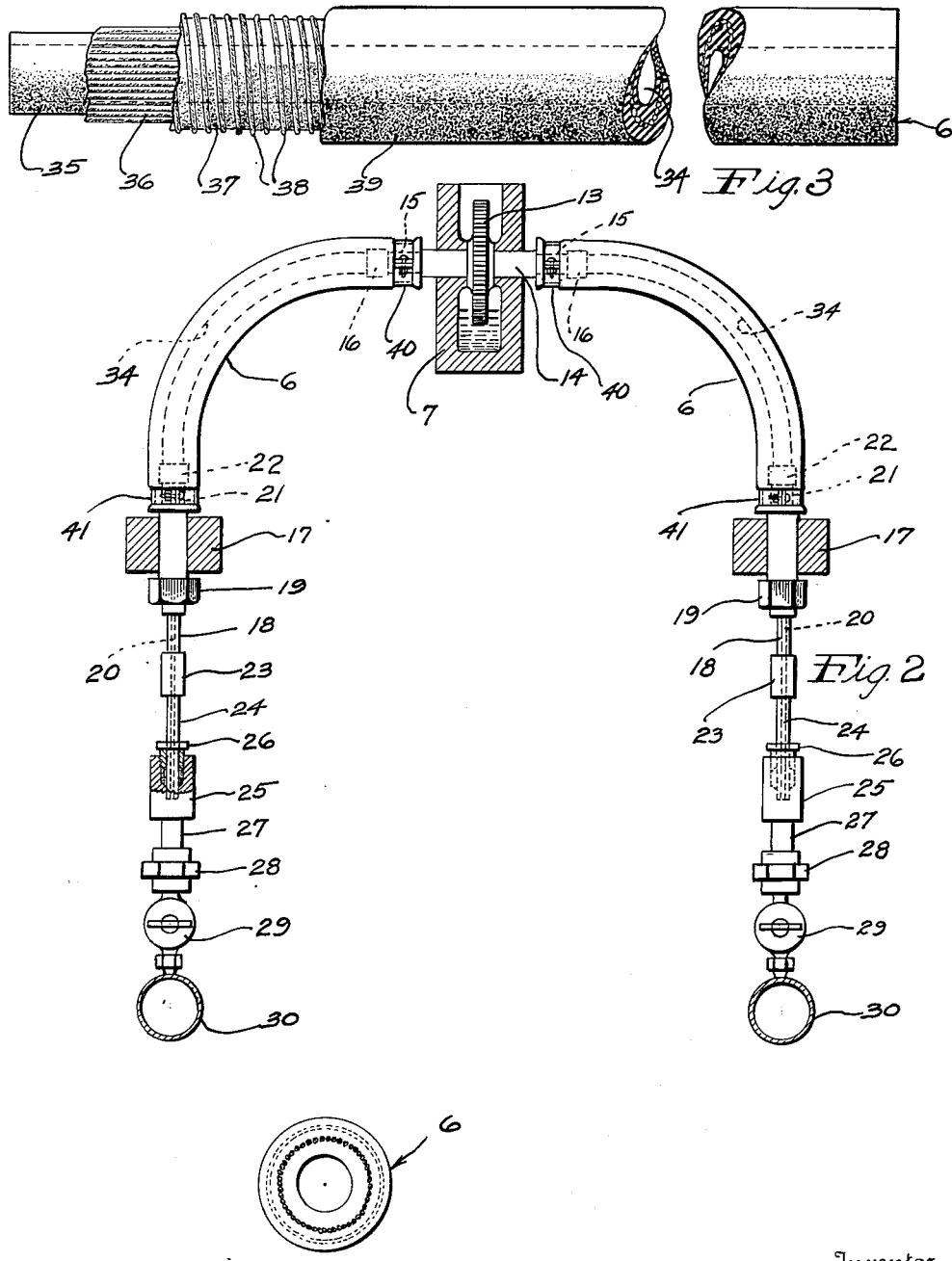

Patented Dec. 10, 1946

2,412,524

UNITED STATES PATENT OFFICE 2,412,524

FATIGUE TEST FOR TIRE CORD

Gerald D. Mallory, Akron, Ohio, assignor to Wingfoot Corporation, Akron, Ohio, a corporation of Delaware Application September 19, 1944, Serial No. 554,813

4 Claims. (Cl. 73—91)

This invention relates to methods for testing textile materials. More particularly, the invention pertains to a novel method of determining fatigue resistance and durability of the textile elements under various operating conditions.

It is an object of the present invention to provide a novel method of testing textile elements which introduces factors affecting fatigue of said textile elements being tested and closely approximating in nature and extent those factors which cause fatigue in the normal use of the textile elements.

It is a further object of the present invention to provide a test method which will enable the laboratory technician to forecast with reasonable accuracy the probable effective life of textile elements in the performance of their normal functions.

It is another and more specific object of the present invention to provide a method of testing which subjects sample textile elements, such as tire cord and the like to tension, compression and similar stresses encountered by such cord in normal operation to facilitate the selection of a cord construction best suited to use in tires from the standpoint of fatigue resistance.

The invention further contemplates a new method of testing tire cord which substantially duplicates conditions existing in a tire structure under actual operating circumstances. The procedural steps may readily be varied in the course of the test to provide any desired combination of operating conditions. As a result, the test specimen is capable of closely approximating actual tire-operating conditions. Thus, it is readily possible to select, with suitable accuracy, the cord specification which best resists fatigue arising out of tension, compression and other related stress factors.

There are a number of well known prior art forms of testing equipment embodying a test procedure capable of producing results generally similar to those of the present invention. All of these devices, however, fail to reflect with sufficient accuracy certain of the actual operating conditions which take place in a tire and, therefore, represent only an approach to the ultimate solution of the problem of selecting the ideal specification for cord construction to produce universally efficient operation and maximum tire mileage.

The method disclosed by the Ray Patent 2,235,-622, upon which the present invention represents an improvement, is a highly efficient test procedure for determining certain specific cord characteristics. The method of the patent contemplates the use of a test specimen which employs only a single cord sample embedded in a solid rod of rubber and, thus, does not always forecast the possible fatigue resistance of cord to such common causes of tire failure as shoulder break. The method of the present invention contemplates the combined use of a plurality of test cords and inflation of the test specimen to reproduce those factors which result in tire failure from shoulder break and the like.

It has been found that the requirements for a successful test in the development of tire cord resistant to shoulder break involve a cycle in which the cords to be tested are first subjected to tension up to approximately 2 to 3 pounds, although other values are permissible, and thereafter subjected to endwise compression up to 15 to 30 per cent. While the cords are under compression, they should be constrained by a surrounding insulation of rubber backed up by an inflation pressure to increase the probability of fiber buckling within the cords while they are being shortened in length. The method of testing contemplated by the present invention provides all of the aforementioned desirable attributes of a testing procedure to facilitate the development of a highly efficient tire cord construction.

Other objects and advantages of the present invention will be apparent as the description with reference to the accompanying drawings which illustrate one form of device for practicing the invention proceeds.

In the drawings, Fig. 1 represents an elevation of a typical form of testing apparatus which is capable of performing the test method of the present invention; Fig. 2 is a partial cross-section taken along the line 2—2 in Fig. 1 with parts in section and broken away for the sake of clearness; Fig. 3 is an elevation with portions broken away to illustrate the construction of a typical test specimen; Fig. 4 is an end elevation of the test specimen of Fig. 3.

The typical form of testing apparatus illustrated in Fig. 1 and indicated generally by the reference character 1 is advantageously adapted to be employed in demonstrating the use of the test specimen according to the test procedure of the present invention. The testing machine 1 embodies a frame structure comprising uprights 2 together with horizontal members 3, 4 and base 5.

Any suitable arrangement and number of individual test positions may be employed in the construction of the testing machine 1, the arrangement of positions being one in which a dual arrangement of a plurality of test specimens 6 is provided, one group being disposed on each side of the longitudinal center line of the machine. To this end, a housing 7 is disposed centrally of the frame structure of the machine 1 and supported from the uprights 2. The housing 7 has a horizontally disposed drive shaft 8 extending transversely of its longitudinal dimension and supporting a drive gear 9 thereon within the housing 7.

The drive shaft 8 may be actuated in any of several different ways such, for example, as by means of a pulley 10 and a belt 11 connected to the motor 12 mounted on the base 5 of the frame structure. The drive gear 9 is adapted to mesh with a horizontally extending gear train comprising a plurality of mutually intermeshing gears 13. Each gear 13 is mounted on a stub shaft 14 which is rotatably mounted in the housing 7 with shafts 14 being disposed in spaced relation longitudinally of the housing and generally parallel with respect to the drive shaft 8. An annular groove 15 is machined adjacent each end of each of the shafts 14 so as to form enlarged portions 16 at the ends thereof.

Disposed on each side of the frame structure at a point intermediate the horizontal members 3 and 4 is a horizontal member or bearing block 17 supported at its ends by the uprights 2. The bearing block 17 has a plurality of rotatably mounted tubular members 18 extending vertically through spaced apertures therein so that the projecting ends of the tubular members 18 are disposed substantially at right angles to the axis of the stub shafts 14 and the drive shaft 8. Any suitable means such as the lock nuts 19 may be employed to adjust and secure the tubular members 18 in their proper axial relation with respect to the bearing block 17.

Each tubular member 18 has an internal bore 20 extending axially and from end to end thereof. Each tubular member 18 has an annular groove 21 machined thereon adjacent that end which projects above the bearing block 17 so as to form an enlarged portion 22 at its end. A flexible coupling 23 is employed to connect each tubular member 18 to an associated tube 24. The end of tube 24 opposite that attached to the tubular member 18 extends into one end of a packing member 25 and is secured therein by the packing nut 26 which serves to hold in place the packing, which may take any conventional form, with respect to the end of the tube 24 and at the same time enable the latter to rotate with the tubular member 18.

A nipple 27 threaded onto the end of the packing member 25 opposite the packing nut 26 is adapted to be interconnected as by means of a union 28 to a shut-off cock 29. The shut-off cocks 29 are provided to manually and individually control the supply of fluid to the associated tubular members 18 from the supply lines 30. A supply line 30 extends along each side of the machine and furnishes fluid under pressure to each of the test positions therealong. A suitable branch connection 31 may be provided to introduce the fluid under pressure from a supply source to the supply lines 30. The branch connection 31 advantageously carries a pressure gauge 32 and a regulator unit 33 to facilitate the test operations.

The test specimen 6 has an axial bore 34 extending from end to end of the specimen. The bore 34 is formed in the test specimen 6 by rolling a plurality of sheets of uncured rubber or other similar plastic material on a steel rod (not shown) approximately one-half inch in diameter until the material is built up to form a cylinder 35 of a diameter of about thirteen-sixteenths of an inch. A ply 36 in strip form embodying two strips of rubber material between which is disposed a plurality of cords previously prepared and treated for testing purposes is next rolled about the member 35 so that the sample 6 will have a single ply with the test cords extending substantially axially of the finished test specimen. Suitable means and materials such as those customarily used in the actual production of tires are employed in the preparation of the ply 36 for insuring that the test cords will properly adhere to the rubber material between which they are disposed.

After the test cord ply 36 is in place and its ends butt spliced, additional sheets 37 of rubber material are wrapped on over the cord ply 36 until the sample is about one inch in diameter. A constraining cord 38 is next wound in spiral form externally of the rubber sheets 37 at a pitch of approximately ten turns per inch. Thereafter, additional sheets 39 of rubber material are applied to the test sample 6 so as to over-lie the constraining cord 38, thereby bringing the external diameter of the test sample when finished to approximately one and three-thirty seconds.

The purpose of the constraining cord 38 is to balance the pneumatic forces introduced by the inflation of the test specimen. It will be understood that only the axial component of the force exerted by the pressure of the fluid with which the test specimen is inflated is employed in the fatigue testing operation and that some restraining means is required to absorb the radial component of the pneumatic forces.

The rods carrying the test specimen 6 are next placed in a hose repair vulcanizing unit (not shown) and cured for about one hour at approximately 275° F. The specimen stock is then removed from the rods and cut into hollow cylindrically shaped pieces about nine and one-half inches in length for use in the testing machine 1. One end of each test specimen 6 is secured as by means of a standard three-fourths inch hose clamp 40 to an end of a stub shaft 14 in the test machine 1. In the same manner, the opposite end of each test specimen is fastened to one of the rotatably mounted tubular means 18 on one of the bearing blocks 17 as by a hose clamp 41.

It will be understood that when the test specimen 6 is mounted in the testing machine 1 the clamps 40 and 41 on the ends thereof will register with the annular grooves 15 and 21 on the stub shaft 14 and tubular member 18, respectively. Thus, the end of the test specimen 6 attached to the stub shaft 14 will, upon closing of the clamps 40, abut the enlarged end portion 16 on the shaft seal or plug that end of the bore 34. Leakage of fluid admitted under pressure to the test specimen 6 from the supply line 30 through the bore 20 in tubular member 18 may thus be prevented at the other end of the specimen. Likewise, clamp 41 provides a leakproof connection at the other end of the test specimen with the tubular member 18, in cooperation with its enlarged end portion 22.

In the operation of the testing machine 1, it is desirable to provide for the automatic recordation of the number of cycles or rotations of the test specimen 6 to failure. This may be readily accomplished by providing a pulley 42 driving a pulley 43 on a gear box 44 by means of a belt 45. A shaft 46 flexibly connected to the gear box 44 actuates a counter mechanism 47 mounted adjacent the gear box on the uppermost horizontal member 3 of the frame structure of the testing machine 1. A handle or knob 48 may, if desired, be provided on the drive shaft 8 so as to enable the operator attending the machine to actuate the same manually thereby facilitating inspection of the test specimens in the course of the testing operation.

The operation of the testing machine 1 in keeping with the testing method will be quite readily apparent from the foregoing description of its construction but should be amplified to explain that procedure with respect to the inflation of the test specimens. It has been found desirable to start the operation of the testing machine 1 after the test specimens 6 are in place and to permit the same to operate through a predetermined number of cycles before inflating said test specimens 6. After the machine has been permitted to complete this predetermined number of cycles of operation, the test specimens 6 are inflated and the fluid pressure is thereafter increased in increments at each recurrence of the original predetermined number of cycles.

Thus, by a way of explanation, the test specimens 6 would be run for say one hundred thousand cycles as indicated by the counter mechanism 47 before air at five pounds pressure is introduced to the bore 34 of each of the test specimens from the supply lines 30. Upon the completion of two hundred thousand cycles, the air pressure would thereafter be increased another five pounds for each one hundred thousand cycles of operation of the test machine to failure of the test specimens.

In the testing of specimens embodying cord samples, the end point of the test is reached when the test cord stretches or breaks in one portion of the bent test specimen permitting it to flop more or less wildly about its axis in its rotation. This flopping action is a warning of failure and generally the operation of the machine is halted when the end point is reached to permit this specimen to be removed. Under certain circumstances, it may be desirable to continue the rotation of the specimen until it actually blows out.

The inflation of the test specimens 6 with fluid under pressure enables the test procedure to approximate more closely actual operating conditions in a tire and thereby to aid in the selection of the most efficient cord construction for employment in tire fabrics. The fact that the test specimens 6 are subjected to air or other suitable fluid under pressure during the flexing or bending operation insures that the cords being tested will be constrained while under pressure by the surrounding inflated rubber. The inflation pressure employed increases the probability of buckling of the individual component fibers in the cords while they are, in effect, being shortened in their overall length by the compressive force which is imparted by the flexing or bending operation.

The testing procedure of the instant invention reproduces substantially the same stresses in the test cords as those which are encountered in pneumatic tires, particularly those encountered in the sidewalls of such tires when in actual use. In the manipulation of the test specimens, cord bucks cord in the same manner as it does in a tire sidewall under ordinary operating conditions. This action is assisted by the inflation pressure exerted on the test cords, separation and spreading of which is resisted by the action of the outer spirally wound constraining cord.

It will be obvious that many modifications may be made in the apparatus illustrated and described as employing the test samples and demonstrating the method of operation contemplated by the present invention without departing from the spirit and scope of the invention. For example, the starting inflation pressure for the testing operation may be above zero pounds pressure, and the operating cycle may be widely varied, if desired.

It will be further understood that the operation of the test apparatus may be varied by maintaining the inflation pressure at a given level but at the same time stepping up the speed of rotation of the test specimen after a pre-determined number of cycles. Moreover, the test specimen may be altered slightly by the employment of more than a single ply of the test cords in the build-up of the specimen. These cords may be disposed in oblique relation to the axis of the test specimen being arranged at a slight angle to the right and left thereof in a manner similar to that customarily employed in the manufacture of tires.

While, in accordance with the patent statutes, one form of the invention has been illustrated and described in detail, it should be particularly understood that the invention is not to be limited thereto or thereby, but that the scope of the invention is defined in the appended claims.

What I claim is:

1. The method of testing textile elements comprising the steps of embedding a plurality of such elements in the body of a generally tubular member composed of a flexible material, such as rubber, bending the tubular member, inflating the tubular member, and contemporaneously causing it to rotate about its axis while maintained in bent condition.

2. The method of testing textile elements comprising the steps of incorporating a plurality of the textile elements in substantially axial relation within the body of a generally tubular member of flexible material, such as rubber, bending the tubular member, rotating the tubular member about its axis while maintained in bent condition, and contemporaneously introducing fluid under pressure to the interior of the tubular member.

3. The method of testing textile elements comprising the steps of arranging a plurality of the textile elements to be tested in substantially axial relation within the body of a generally tubular member of flexible material, such as rubber, bending the tubular member, rotating the tubular member about its axis while it is bent, contemporaneously introducing fluid, such as air, under pressure to the interior of the tubular member, and increasing the fluid pressure after a predetermined number of rotations.

4. The method of testing textile elements comprising the steps of embedding a plurality of such elements in the body of a generally tubular member composed of a flexible material, such as rubber, bending the tubular member, inflating the tubular member, contemporaneously causing it to rotate about its axis while maintained in bent condition, and externally confining the textile elements whereby said textile elements are constrained between the internal inflation pressure and their external confinement.

GERALD D. MALLORY.